UNITED STATES PATENT OFFICE.

JOSEPH ROBLEY, OF BROOKLYN, NEW YORK.

IMPROVEMENT IN MANUFACTURE OF FLOOR-CLOTH.

Specification forming part of Letters Patent No. 208,036, dated September 17, 1878; application filed June 27, 1878.

*To all whom it may concern:*

Be it known that I, JOSEPH ROBLEY, of the city of Brooklyn, in the county of Kings and State of New York, have invented a new and useful Improvement for Covering of Floors; and that the following is a full, clear, and accurate description of the same.

The object of my improvement is to form a new covering for floors which shall be better, and more durable and substantial than any other floor-covering now in use.

The principal element of my improvement is sawdust or ground wood or other vegetable fiber.

For the purpose of making the sawdust or ground wood or other vegetable fiber adhere to the canvas which forms the base of the floor-covering, I use copal or other varnish. I also use French ocher or whiting or mineral or metallic dry paint to form any color which it is desired my improved floor-covering shall have.

I can make my composition which I use to spread on the canvas of any quantity desired, and the following are proper proportions for a suitable quantity: To one hundred and sixty pounds of sawdust or ground wood or other vegetable fiber I add eighty gallons of copal or other varnish. To these quantities of these ingredients I add either one hundred and sixty pounds of French ocher, or one hundred pounds of whiting, or one hundred pounds of mineral or metallic dry paint, for the purpose of giving the desired coloring to said ingredients, namely, sawdust or ground wood or other vegetable fiber and the varnish; but I do not intend, however, to confine myself to the exact proportions above specified; but the proportions and quantity can be varied as desired.

The materials above named are then thoroughly mixed. If the mixture thus obtained is too thick, it should be diluted by adding petroleum-naphtha and varnish, as above mentioned, in equal parts. The mixture is then ready for spreading on the canvas, which forms the base of the floor-covering, and which is stretched on a frame. The mixture can be spread with a brush, or smoothed with a trowel, or drawn through a scraping-machine, or spread in any other suitable manner. After the first coat of this mixture is spread on the canvas, it should be dried, and then repeated coats of the mixture should be applied, repeating the drying between each application of the mixture.

The floor-covering can be made of any thickness desired, and its thickness can be varied according to the different purposes to which it is desired to apply the floor-covering. A good average thickness is one-eighth of an inch.

The floor-covering so produced can then be printed, stamped, or embossed in the ordinary manner.

I am aware that some of the ingredients herein mentioned have been combined with mineral menstrua for the purpose of forming compositions for coating various objects; but such is not my invention; but What I do claim as my invention, and desire to secure by Letters Patent, is—

As a new article of manufacture, a covering for floors consisting of sawdust, ground wood, or other vegetable fiber combined with copal or other hard varnish, with which is incorporated mineral coloring or dry paint, so as to form a thick paste or coating, and spread upon a canvas, textile, or fibrous base, either with or without ornamentation, substantially as described, and for the purpose set forth.

In testimony that I claim the foregoing I have hereunto set my hand this 26th day of June, 1878.

JOSEPH ROBLEY.

In presence of—
   CHARLES G. COE,
   W. E. STONE.